(12) United States Patent
Dolgas et al.

(10) Patent No.: US 7,706,832 B2
(45) Date of Patent: Apr. 27, 2010

(54) SYSTEMS AND METHODS FOR USING ALIASES TO MANAGE CONTACT INFORMATION IN A MOBILE COMMUNICATION DEVICE

(75) Inventors: Janine Dolgas, San Diego, CA (US); Mark Robinson, Palo Alto, CA (US)

(73) Assignee: Kyocera Wireless Corp., San Diego, CA (US)

( * ) Notice: Subject to any disclaimer, the term of this patent is extended or adjusted under 35 U.S.C. 154(b) by 1173 days.

(21) Appl. No.: 11/134,663

(22) Filed: May 20, 2005

(65) Prior Publication Data

US 2006/0281490 A1  Dec. 14, 2006

(51) Int. Cl.
*H04M 1/00* (2006.01)
(52) U.S. Cl. .................. 455/551; 455/564; 455/566; 455/556.2; 455/415; 455/418; 379/355.09
(58) Field of Classification Search .............. 455/551, 455/412.1, 466, 564, 556.2, 566, 575.1, 90.3, 455/415, 418; 379/355.05
See application file for complete search history.

(56) References Cited

U.S. PATENT DOCUMENTS

| | | | | |
|---|---|---|---|---|
| 4,723,265 | A * | 2/1988 | Kamei et al. ............. | 455/564 |
| 4,800,582 | A * | 1/1989 | D'Agosto et al. ........ | 379/216.01 |
| 4,908,853 | A * | 3/1990 | Matsumoto ............. | 379/355.09 |
| 5,267,308 | A * | 11/1993 | Jokinen et al. ............. | 379/354 |
| 5,274,693 | A * | 12/1993 | Waldman ................. | 455/564 |
| 5,491,745 | A * | 2/1996 | Roeder .................... | 379/355.09 |
| 5,535,258 | A * | 7/1996 | Joglekar et al. ........... | 455/564 |
| 5,581,595 | A * | 12/1996 | Iwashita et al. ........... | 455/564 |
| 5,675,630 | A * | 10/1997 | Beatty ..................... | 455/551 |
| 5,768,362 | A * | 6/1998 | Moon ...................... | 379/355.05 |
| 5,930,350 | A * | 7/1999 | Johnson ................... | 379/355.06 |
| 6,084,951 | A * | 7/2000 | Smith et al. .............. | 379/93.17 |
| 6,097,808 | A * | 8/2000 | Chang .................... | 379/355.05 |
| 6,295,355 | B1 * | 9/2001 | O'Neal et al. ............ | 379/355.05 |
| 6,360,110 | B1 * | 3/2002 | Schmidt .................. | 455/564 |
| 7,190,975 | B2 * | 3/2007 | Rho ........................ | 455/564 |
| 7,231,229 | B1 * | 6/2007 | Hawkins et al. ........... | 455/564 |
| 7,292,978 | B2 * | 11/2007 | Endo et al. ............... | 704/243 |

(Continued)

FOREIGN PATENT DOCUMENTS

WO   WO 01/44912   6/2001

(Continued)

OTHER PUBLICATIONS

International Search Report (ISR): PCT/ISA/210 for International Application No. PCT/US2006/019587, ISR dated Oct. 18, 2003, 3 pages.

*Primary Examiner*—Sharad Rampuria (57) ABSTRACT

An alias can be used to access address book information across multiple communication applications. The alias can also be a screen name, for example, an instant messenger screen name. However, the alias can be used to access more than just instant messenger contact information; it can be used to access other information, including telephone numbers, SMS, EMS and MMS contact information as well as instant messenger contact information. Additionally, the single alias can be used to access instant messenger contact information across multiple instant messenger services. An alias can be assigned that is easy to remember; for example, it can be a shortened version of the contact's name, or a nickname.

18 Claims, 7 Drawing Sheets

U.S. PATENT DOCUMENTS

| | | | |
|---|---|---|---|
| 7,366,529 B2 * | 4/2008 | Alanara et al. | 455/466 |
| 7,526,081 B1 * | 4/2009 | Vashisht et al. | 379/433.06 |
| 7,536,206 B2 * | 5/2009 | Hardy et al. | 455/564 |
| 7,551,899 B1 * | 6/2009 | Nicolas et al. | 455/73 |
| 2002/0169007 A1 * | 11/2002 | Lim | 455/564 |
| 2003/0211861 A1 * | 11/2003 | Castrogiovanni et al. | 455/551 |
| 2004/0266414 A1 | 12/2004 | Likwornik | |
| 2005/0208977 A1 * | 9/2005 | Mori et al. | 455/564 |
| 2008/0020741 A1 * | 1/2008 | Kim | 455/415 |
| 2009/0170562 A1 * | 7/2009 | Kujala et al. | 455/564 |

FOREIGN PATENT DOCUMENTS

WO    WO 2005/062586    7/2005

* cited by examiner

FIG. 7

SYSTEMS AND METHODS FOR USING ALIASES TO MANAGE CONTACT INFORMATION IN A MOBILE COMMUNICATION DEVICE

BACKGROUND

1. Field of the Invention

The field of the invention relates generally to mobile communication devices and more particularly to managing contact information for a plurality of communication applications running on a mobile communication device.

2. Background Information

Conventional mobile communication devices, such as cellular telephones and Personal Digital Assistants (PDAs) with communication capability, can be configured to support a variety of communication applications, or services, including, for example, voice communication services, Short-Message-Service (SMS), Enhanced Message Service (EMS), Multimedia Messaging Service (MMS), and Instant Messaging (IM). Conventional mobile communication devices often include an "address book" to keep track of contact information for a plurality of contacts; however, maintaining contact information for a large number of contacts can become unwieldy, making conventional address books difficult to use.

This problem is compounded when a mobile communication device is configured to support multiple communication applications, because each contact can potential be associated with a different contact identifier for each communication application. For example, each contact can have a unique telephone number, SMS address or identifier, IM address or identifier, etc. Accordingly, conventional address books can become filled with enough information that they are difficult to navigate and use.

Conventional address books typically provide several navigation methods. For example, the user can scroll through each entry one entry at a time. Such an approach is generally manageable when the address book is small, but quickly becomes unmanageable, or at least time consuming, as the address book grows. In many cases the user can also enter a letter, for example, the first letter of a last name, to limit the number of entries that must be subsequently searched. This can still be time-consuming for long lists. A user can sometimes enter more characters to further limit the number of entries to be searched, even zeroing in on the precise entry. This can require that several characters be entered to select a contact.

A "speed dial" approach can also be used to allow quick access to entries in an address book. In such an approach, a contact is associated with a defined storage location. For example, a communication device can have perhaps 1 to 99, or more, defined storage locations for this purpose. A user can then access a contact by entering an identifier, such as a number, that identifies the associated storage location. A drawback to this approach, however, is that a typical user can only remember the storage identifier for a relatively small number of contacts. Thus, the user ends up scrolling through the speed dial locations anyway.

SUMMARY OF THE INVENTION

One way to quickly access address book information is through the use of aliases. An alias can be assigned that is easy to remember; for example, it can be a shortened version of the contact's name, or a nickname. The alias can also be a screen name, for example, an instant messenger screen name; however, the alias can be used to access more than just instant messenger contact information. For example, the alias can be used to access address book information, including telephone numbers, SMS, EMS, IM and MMS contact information.

In one aspect, a single alias can even be used to access IM contact information for multiple IM services.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

In the systems and methods described below, an alias is associated with contact entries in an address book included in a communication device. The alias can then be used to access the appropriate contact identifier for a specific communication application. For example, if a user of a mobile communication devices is trying to send an SMS message to a specific contact, then the alias can be used to select the contacts SMS address. The aliases are provided by the user and can, therefore, be easier to remember than, e.g., a speed dial location. Moreover, a single alias can be used to select the appropriate contact identifier for each communication application supported.

For purposes of this specification and the claims that follow, the term contact identifier is intended to refer to the number, address, or other identifier used to establish a communication with the contact using a given communication application (e.g, a telephone number, SMS number, email address, etc.).

Figure 1:
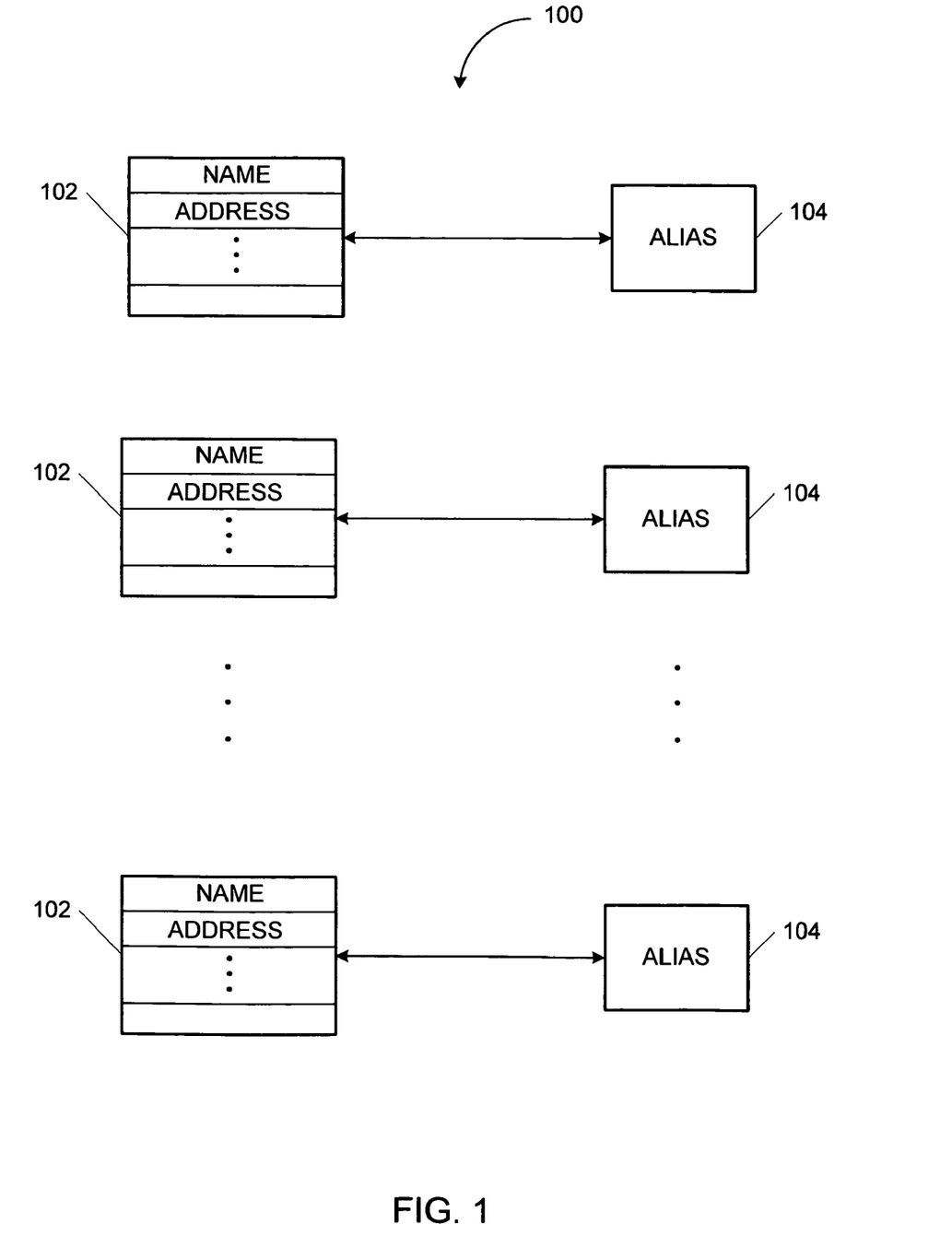
FIG. 1 is a diagram illustrating an address book that includes aliases in accordance with one embodiment.

FIG. 1 is a diagram illustrating an address book 100 configured in accordance with one embodiment of the systems and methods described herein. As can be seen, address book 100 comprises a plurality of contact entries 102. Contact entries 102, can for example, comprise contact information such as the name of the contact, address, business, title, etc., as with many conventional address books. Further, each contact entry can contain one or more contact identifiers for the associated contact. In addition, however, an alias 104 is associated with each contact entry 102. Alias 104 can be a moniker that is associated with the contact by the user. Alias 104 can, for example, be a name, nickname, initials, abbreviation, screen name, etc. Preferably, an alias 104 associated with a specific contact will be easy to remember.

Generally, each contact entry 102 is associated with a single alias 104; however, depending on the embodiment, a contact can be associated with a plurality of aliases 104. A single alias 104 can also be associated with more than one contact entry 102. Additionally, in certain embodiments, certain contact entries 102 may not be associated with an alias 104.

Figure 2:
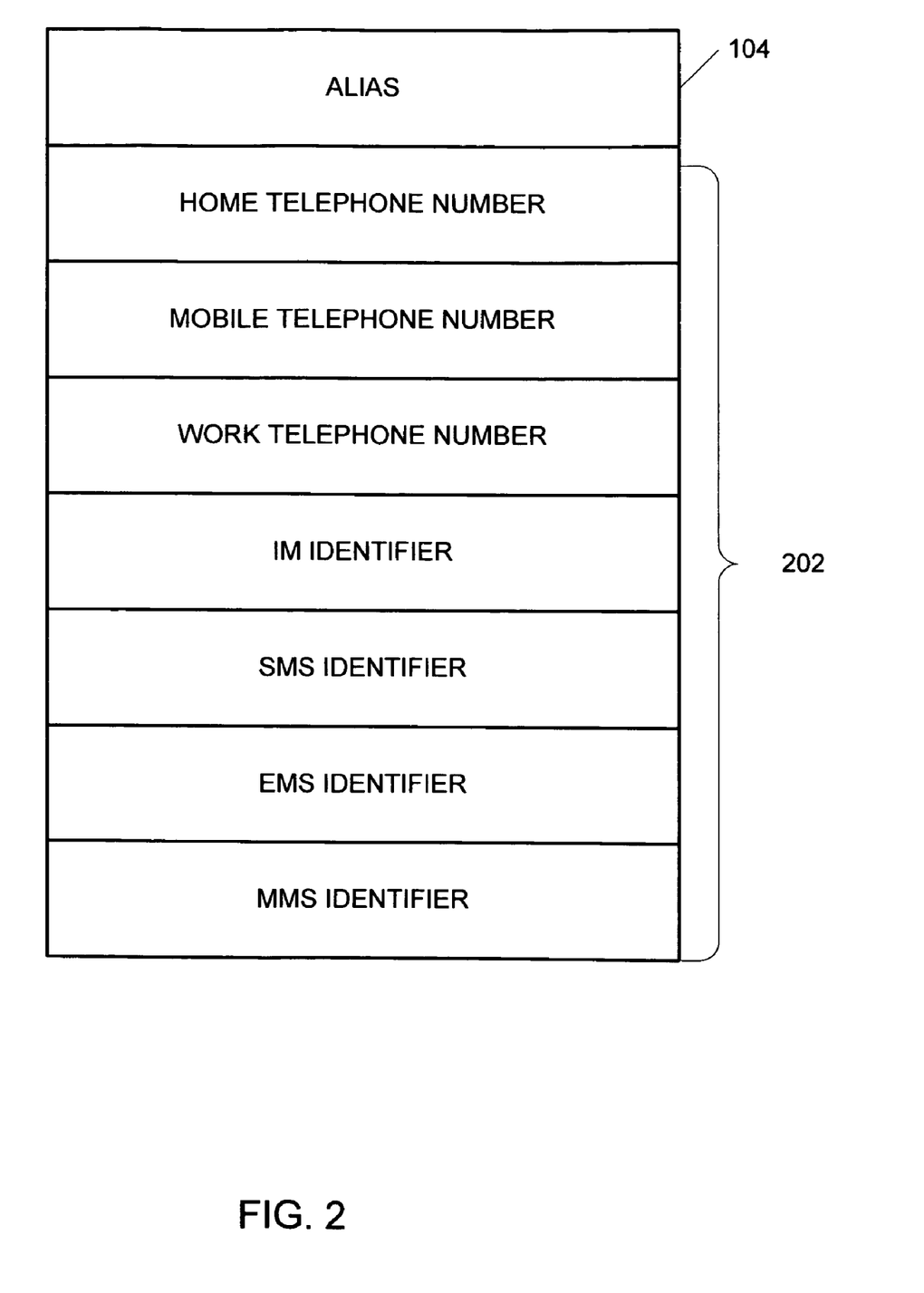
FIG. 2 is a diagram illustrating an association between an aliases and a plurality of contact identifiers included in a contact entry of the address book of FIG. 1.

Thus, the contact entry 102—alias 104 association generates an association between the contact identifiers included in the contact entry and the associated alias. This is illustrated in the diagram of FIG. 2. As can be seen, the contact entry 102 can include a plurality of contact identifiers 202. These can include a home telephone number, mobile telephone number, work telephone number, IM identifier, SMS contact identifier, EMS contact identifier, MMS contact identifier, etc. In many embodiments, contact identifiers 202 will only include identifiers for communication applications supported by the associated communication device; however, in certain embodiments, contact identifiers for unsupported communication applications can also be stored in contact entry 102. Each of these contact identifiers 202 is associated with the corresponding alias 104. The association between contact identifiers 202 and alias 104 can allow for quick access to contact information and identifiers as described in detail below.

It will be appreciated that there are many methods by which the alias information can be entered and associated with a contact entry. For example, the user can be allowed to enter the aliases into the user's communication device when the user is entering other contact information. In certain embodiments, a software program running on a computer can be used to enter and manage contact and alias information, which can then be downloaded to the communication device.

Figure 3:
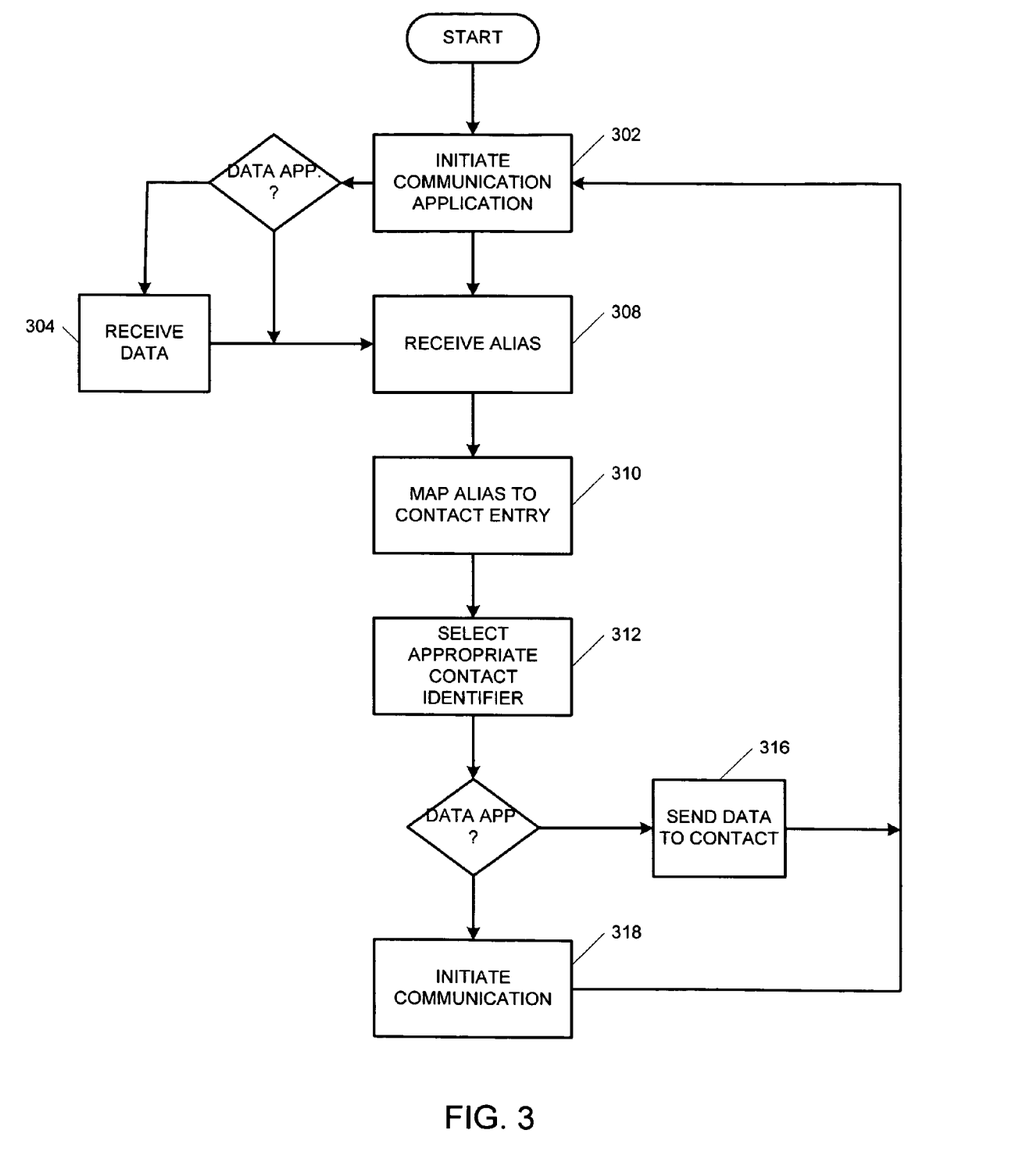
FIG. 3 is a flow chart illustrating an example method for using an alias to send a communication in accordance with one embodiment.

FIG. 3 is flow chart illustrating an example method for using an alias for establishing a communication from the perspective of a communication device in accordance with one embodiment of the systems and methods described herein. First, the communication device can be configured to initiate a communication application, in step 302, in response to an action taken by the user. For example, the user can activate an SMS application supported by the communication device. This will cause the communication device to launch the SMS application and wait for a SMS identifier to be entered in to the device.

Instead of entering an SMS identifier, however, the user can input an alias, which will be received by the device in step 308. The alias can, for example, be input through a user interface associated with the communication device. The device can then map the alias provide in step 304 to the associated contact entry in step 310. The device can be configured to then determine and select the appropriate contact identifier 202, e.g., the associated SMS identifier, in step 312. In other words, the SMS application, or a software program or application configured to run on the communication device, can be configured to scroll through the contact identifiers associated with the corresponding contact entry and select the one the corresponds to, or is appropriate for, the SMS application. Other method for determining or retrieving the appropriate contact identifier may also be used. For example, a function may be defined that retrieves the appropriate contact for the address book data using an application (or application identification) and an alias (or alias identification).

If the communication application selected is a data application, such as an SMS application, then the user can, prior to entering the alias, enter the data, or message, to be transmitted in step 304. In alternative embodiments, or implementations, the data can be entered after the alias is entered (step 308) and the associated contact identifier is selected (step 312). If the application is a data application, then the data can be sent in step 316, once the contact identifier, e.g., SMS identifier, is selected. But if the application is a voice application, for example, then a connection can be made, e.g., a call can be placed, using the selected contact identifier in step 318.

Figure 4:
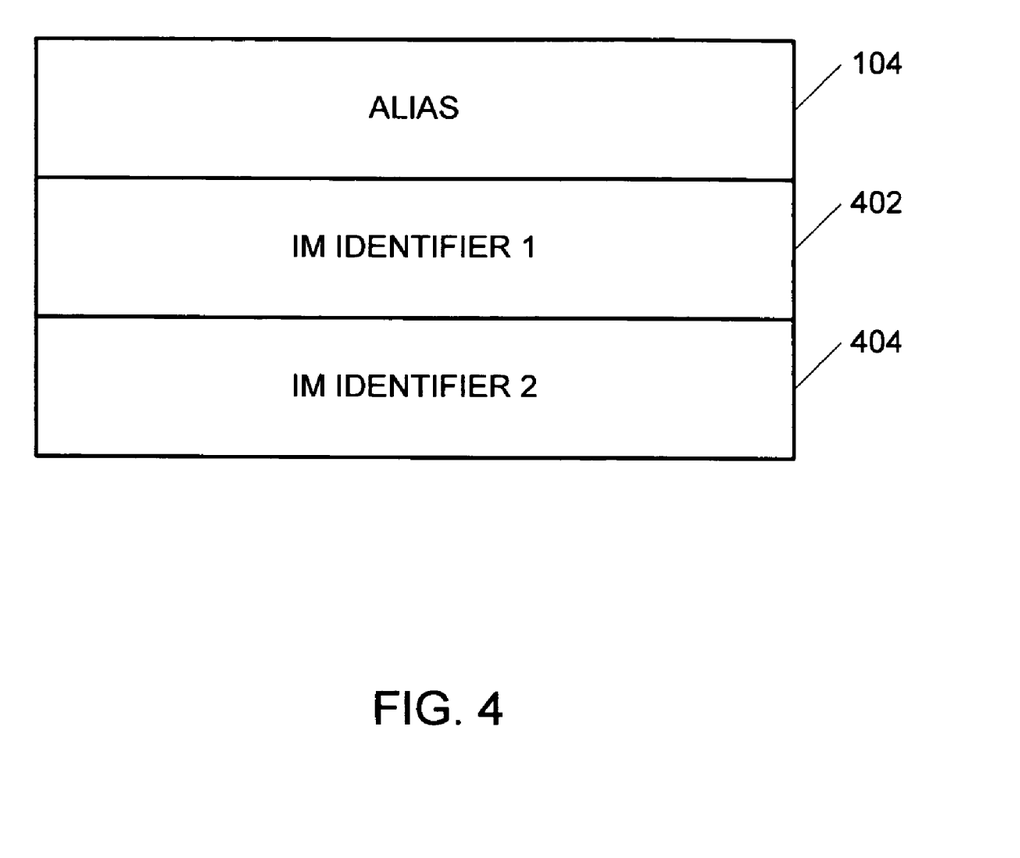
FIG. 4 is a diagram illustrating an association between an alias and multiple IM identifiers.

In certain instances, a contact can have multiple contact identifiers for a given communication application. For example, a contact can have multiple telephone numbers as illustrated in FIG. 3. A user can also have multiple identifiers for other communication applications. FIG. 4, for example, illustrates the situation where multiple IM identifiers 402 and 404 are associated with a single contact and alias 104. Two IM identifier are illustrated in FIG. 4 by way of example only. It will be understood that more than two identifiers for a given communication application can be associated with a single alias, such as the the three telephone numbers in FIG. 3. In such situations, the user can be prompted to select the appropriate identifier.

Figure 6:
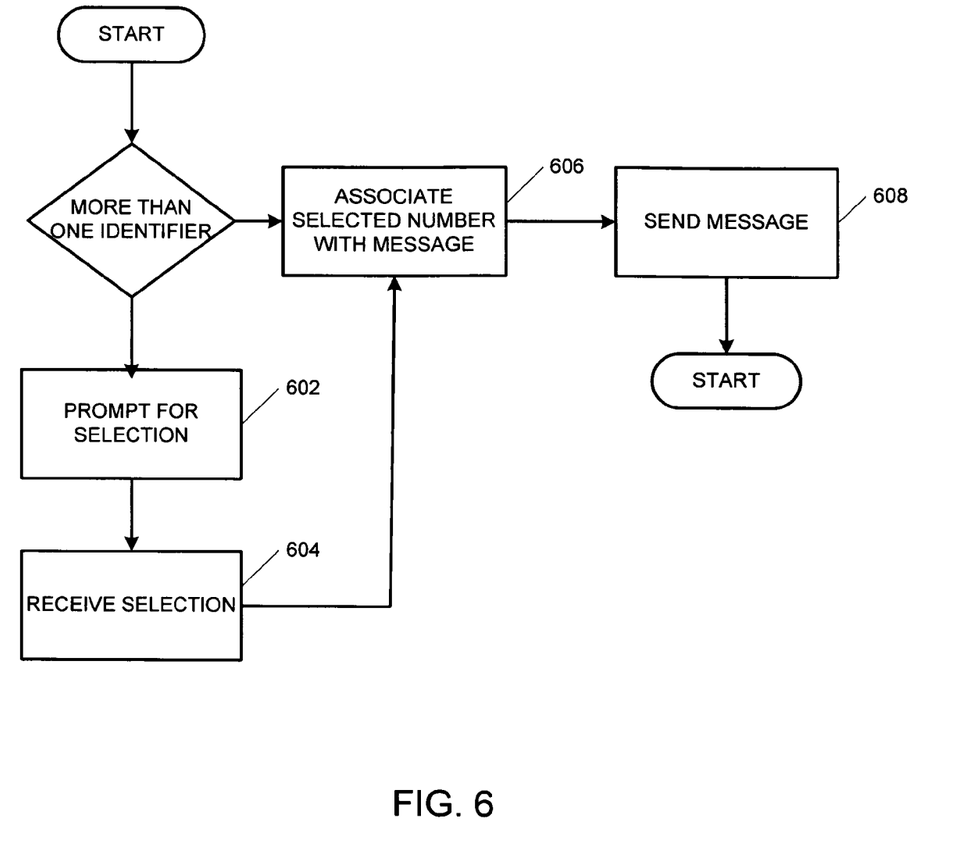
FIG. 6 is a flow chart illustrating an example method for allowing a user to select between multiple contact identifiers associated with the same communication application in accordance with one embodiment.

On example method for prompting the user to select one of multiple contact identifiers associated with the same communication application is illustrated by the flow chart of FIG. 6. In FIG. 6, once it is determined that there are multiple contact identifiers associated with the contact for the selected communication application, the user can be prompted to select the appropriate identifier in step 602. For example, the contact identifiers can be displayed on a display associated with the communication device. The user can then select the appropriate identifier, e.g., by scrolling to the appropriate identifier or entering a number associated with the appropriate identifier, which will be received in step 604. The selected identifier can then be associated with the outgoing message or communication in step 606, which can then be sent or initiated in step 608.

Figure 5:
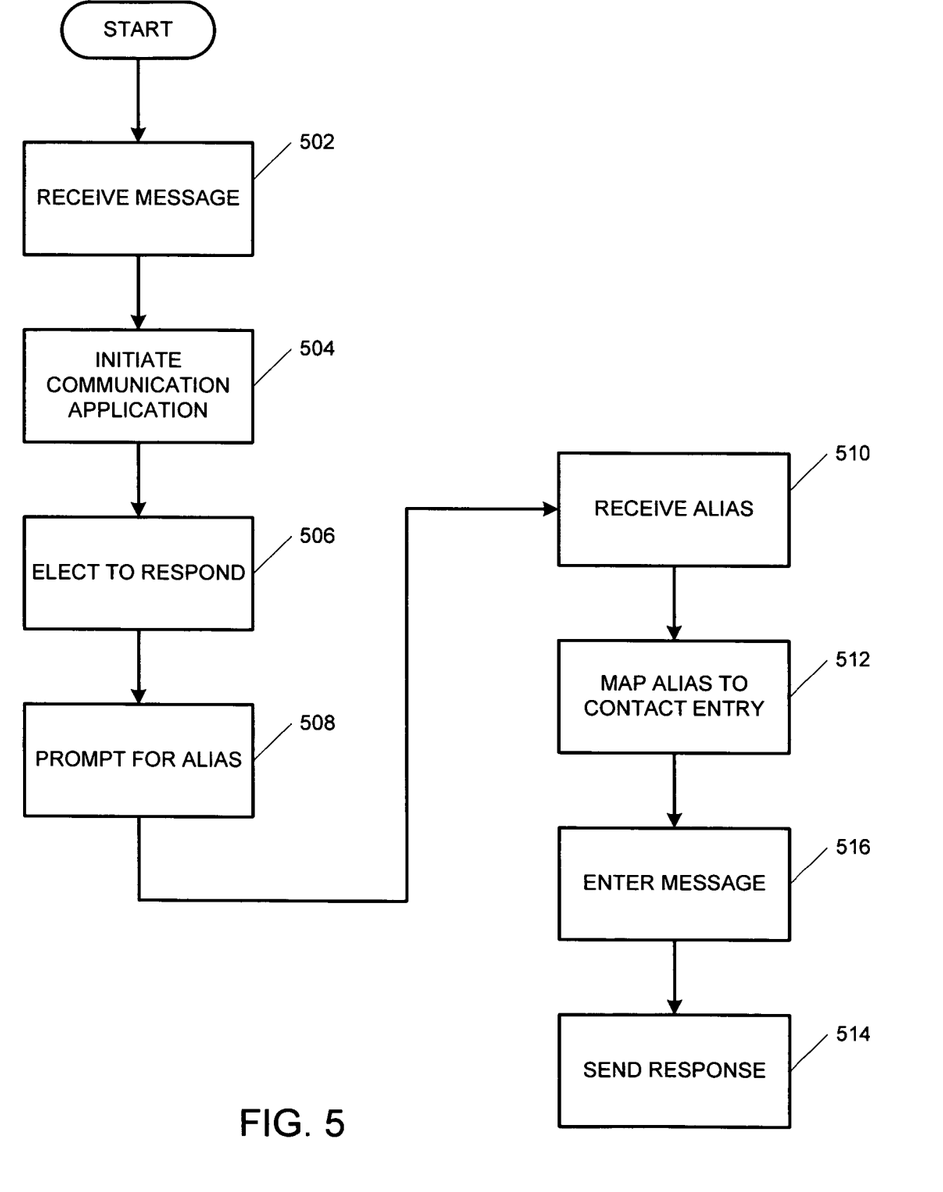
FIG. 5 is flow chart illustrating an example method for using an alias to respond to a message in accordance with one embodiment.

FIG. 5 is a flow chart illustrating an example method for using an alias to respond to, or forward a message, or incoming communication, in accordance with one embodiment of the systems and methods described herein. In step 502, a message, or incoming communication, is received. The user can then select to activate the communication application associated with the message so that the user can view or hear the message. This will cause the communication device to initiate the communication application in step 504. The user can then select to respond to, or forward the message in step 506, which can cause the application to prompt the user for an alias in step 508.

In one embodiment, the contact identifier associated with the received message can appear as a default alias when the user elects to forward or respond to the message. If the user wants to send the response to another party, an additional party, or if no default is used, then the user can enter the appropriate alias in step 510. In step 512, the alias can be mapped to the appropriate contact entry and the appropriate contact identifier can be selected from contact identifiers 202.

The user can be prompted repeatedly until the user has entered the aliases associated with all contacts to which the user desires to forward the message. Once the user is done entering aliases, the message can be forwarded in step 514. But first, the user can be given the option to enter further data, such as a reply message, in step 516, depending on the embodiment and the type of communication involved.

It will be appreciated that the prompt of step 508 can be for a contact identifier, to which the user instead responds with an alias. Accordingly, the device should be configured to recognize an alias, from a contact identifier, and map it to the associated contact entry.

Certain communication applications can incorporate voice recognition. In such instances, the voice recognition component can be trained on the aliases associated with the contact entries. For example, after activating a particular communication application, the user can speak the alias into the device, cause in the device to map the alias to the appropriate contact entry and retrieve the appropriate contact identifier.

Figure 7:
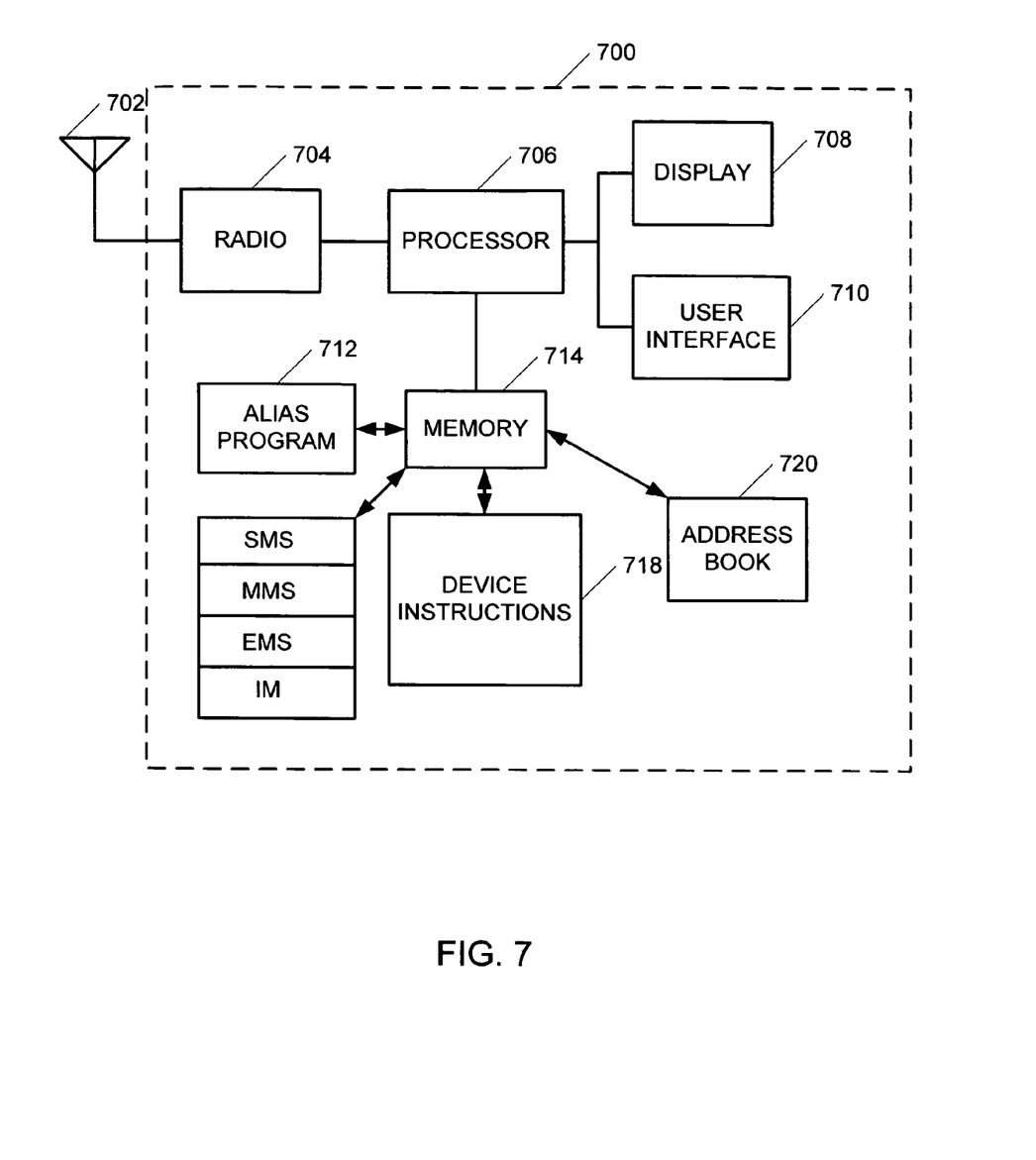
FIG. 7 is a diagram illustrating an example mobile communication device configured to contain the address book of FIG. 1 and implement the methods of FIGS. 3, 5, and 6.

FIG. 7 is a diagram of a mobile communication device 700 configured to implement the systems and methods described above. As can be seen, in the example of FIG. 7, device 700 includes an antenna 702 and a radio 704. Radio 704 can be configured to modulate signals to be transmitted with a carrier frequency and transmit them via antenna 702. Radio 704 can also be configured to demodulate signals received via antenna 702. Processor 706 can be configured to process the transmit and receive signals.

Processor 706 can comprise multiple processors or processing circuits, such as Digital signal Processors (DSPs), audio processors, math coprocessors, etc. These processors and/or processing circuits can be included in a single Integrated Circuit (IC), or several ICs, and can be packaged in a single chip package or multiple chip packages. Radio 704 can be any standard or customized radio configured to transmit signals wirelessly over the air. Antenna 702 can comprise a single or antenna or multiple antennas, e.g., for spatial diversity. In fact antenna 702 can actually comprise one or more arrays of antennas.

Device 700 can also include a memory 714 coupled with processor 706, which can be configured to store instructions 718 and data that can be used by processor 714 to control the operation of device 700. In addition, memory 714 can be configured to store an address book 720, which can comprise contact information and associated aliases as described above. Memory 714 can also store applications such as communication applications 716, which can include, e.g., a SMS application, MMS application, EMS application, IM application, etc. Memory 714 can also store alias program 712.

Thus, a user can cause one of the communication applications 716 to be launched (step 302), e.g., via commands entered through a user interface 710 coupled with processor 706. Once launched, the select communication application can then prompt the user for a contact identifier, e.g., the application can cause a prompt to be displayed on display 708. The user can, in response to the prompt, input an alias (step 308), e.g., through user interface 710. Alias program 712 can be configured to then recognize that an alias was provided, map the alias to the corresponding contact entry (step 310) in address book 720, and select the appropriate contact identifier (step 312). The selected communication application can then send, or initiate, a communication using the contact identifier (step 316).

Alias program 712 can actually comprise part of the communication applications 716 or can be an overlay that works in conjunction with each of communication applications 716.

It should be noted that memory 714 can be one or multiple device contained in one ore multiple circuit packages. For example, memory 714 can include static or dynamic memory, erasable memory, removable memory, etc.

While certain embodiments and/or implementations of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A mobile communication device for communicating with a contact through a plurality of communications applications, comprising:
   a user created address book for storing a plurality of contact entries, the contact entries capable of being located by a corresponding plurality of stored user provided aliases, where an alias of the plurality of user provided aliases is associated with a contact entry of the plurality of contact entries, and with at least one contact entry of the plurality of contact entries having a plurality of contact identifiers;
   a communication application, of the plurality of communications applications, configured to receive a contact identifier, of the plurality of contact identifiers, which is selected by a particular user by the alias of the plurality of user provided aliases, determining the associated contact entry for the alias, and determining the appropriate contact identifier from the plurality of contact identifiers appropriate for use with the communications application, which is selected to communicate with the contact through the communication application disposed on the mobile communications device; and
   wherein the communication application is configured to receive an incoming communication and allow a user to respond by entering an alias to which the response is directed, and wherein the communication application is configured to receive the alias, map the received alias to the associated contact entry and select the appropriate contact identifier from the plurality of contact identifiers associated with the selected contact entry.

2. The mobile communication device of claim 1, wherein the communication application is further configured to use the determined contact identifier to send a communication.

3. The mobile communication device of claim 1, wherein the communication application is a voice communication services, and wherein the determined contact identifier is a telephone number.

4. The mobile communication device of claim 1, wherein the communication application is a Short-Message-Service, and wherein the determined contact identifier is a Short-Message-Service identifier.

5. The mobile communication device of claim 1, wherein the communication application is an Enhanced Message Service, and wherein the determined contact identifier is an Enhanced Message Service identifier.

6. The mobile communication device of claim 1, wherein the communication application is a Multimedia Messaging Service, and wherein the determined contact identifier is a Multimedia Messaging Service identifier.

7. The mobile communication device of claim 1, wherein the communication application is an Instant Messaging Service, and wherein the determined contact identifier is an Instant Messaging Service identifier.

8. The mobile communication device of claim 1, wherein each of the plurality of contact identifiers is associated with a corresponding communication application.

9. The mobile communication device of claim 8, wherein more than one of the plurality of contact identifiers associated with the contact entry is associated with the communication application, and wherein the communication application is configured to prompt a user to select which of the associated contact identifiers is the appropriate contact identifier.

10. A method for managing contact information in a mobile communication device, comprising:

initiating a specific communication application from a plurality of communications applications supported by the mobile communications device;

receiving a user created alias;

mapping the received user created alias to an associated contact entry having a plurality of contact identifiers for establishing communications with a contact using a plurality of communications applications;

determining the appropriate contact identifier for the specific communication application supported by the associated mobile communications device, from the plurality of contact identifiers for establishing communications with a contact through the specific communication application from the plurality of communications applications that are included in the contact entry, the appropriate contact identifier selected based on the communication application and found by using the user created alias;

using the contact identifier to send a communication through the initiated specific communication application;

receiving an incoming communication including an alias;

mapping the received alias to the associated contact entry; and selecting the appropriate contact identifier from the plurality of contact identifiers associated with the selected contact entry.

11. The method of claim 10, further comprising:

receiving contact information associated with a plurality of contact entries, each contact entry comprising a plurality of contact identifiers;

storing the received contact information;

receiving an alias for each contact entry;

storing the received aliases; and associating each received alias with one of the plurality of contact entries.

12. The method of claim 10, wherein the communication application is a voice communication service, and wherein the selected contact identifier is a telephone number.

13. The method of claim 10, wherein the communication application is a Short-Message-Service, and wherein the selected contact identifier is a Short-Message-Service identifier.

14. The method of claim 10, wherein the communication application is an Enhanced Message Service, and wherein the selected contact identifier is an Enhanced Message Service identifier.

15. The method of claim 10, wherein the communication application is a Multimedia Messaging Service, and wherein the selected contact identifier is a Multimedia Messaging Service identifier.

16. The method of claim 10, wherein the communication application is an Instant Messaging Service, and wherein the selected contact identifier is an Instant Messaging Service identifier.

17. The method of claim 10, further comprising prompting the user to select which of multiple contact identifiers associated with the same communication application is the appropriate contact identifier.

18. The method of claim 10 further comprising sending a response to the received message to the contact associated with the contact entry using the selected contact identifier.

* * * * *